United States Patent [19]

Purdy

[11] Patent Number: 4,645,373

[45] Date of Patent: Feb. 24, 1987

[54] QUICK RELEASE CONNECTORS

[75] Inventor: George W. Purdy, Spring Hill, Fla.

[73] Assignee: G. Miller Machine Co., Inc., Ozone Park, N.Y.

[21] Appl. No.: 792,301

[22] Filed: Oct. 28, 1985

[51] Int. Cl.$^4$ ............................................. F16D 1/00
[52] U.S. Cl. .................................... 403/341; 403/381; 24/644
[58] Field of Search ................. 24/644, 129 R, 129 A, 24/129 W; 403/341, 381, 330, 316

[56] References Cited

U.S. PATENT DOCUMENTS

| | | | |
|---|---|---|---|
| 104,884 | 6/1870 | Reinshagen | 403/341 |
| 964,596 | 7/1910 | Williams | 403/341 |
| 1,818,261 | 8/1931 | Koch et al. | 403/341 |
| 1,975,244 | 10/1934 | Wiseman | 403/341 |
| 2,267,802 | 12/1941 | Purdy | 403/316 |
| 2,448,548 | 9/1948 | Purdy | 403/341 |
| 3,065,009 | 11/1962 | Austin | 403/341 |
| 3,606,407 | 9/1971 | Pendergast | 403/341 |
| 4,403,885 | 9/1983 | Babb | 403/381 |

FOREIGN PATENT DOCUMENTS

| | | | |
|---|---|---|---|
| 123305 | 1/1947 | Australia | 403/341 |
| 54546 | 1/1911 | Switzerland | 403/341 |
| 10330 | of 1913 | United Kingdom | 403/341 |

*Primary Examiner*—Victor N. Sakran
*Attorney, Agent, or Firm*—Bauer & Amer

[57] ABSTRACT

A two-part coupling has a first cylindrical member provided with an axially directed and radially open female socket, and a second cylindrical member provided with an axially extending male terminus conforming in shape to and being receivable in the socket through radial insertion therein. The first cylindrical member is further provided with means on its outer surface, manually operable to prevent radial dislodgement of the male member from the socket.

7 Claims, 11 Drawing Figures

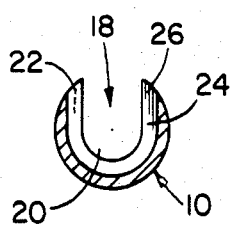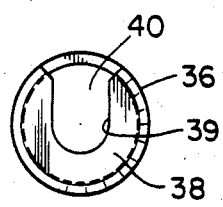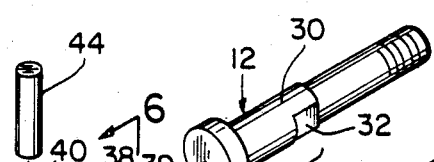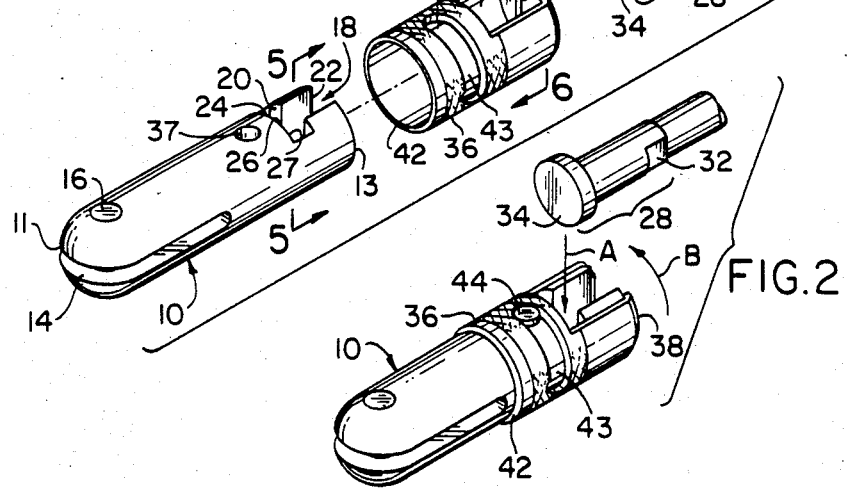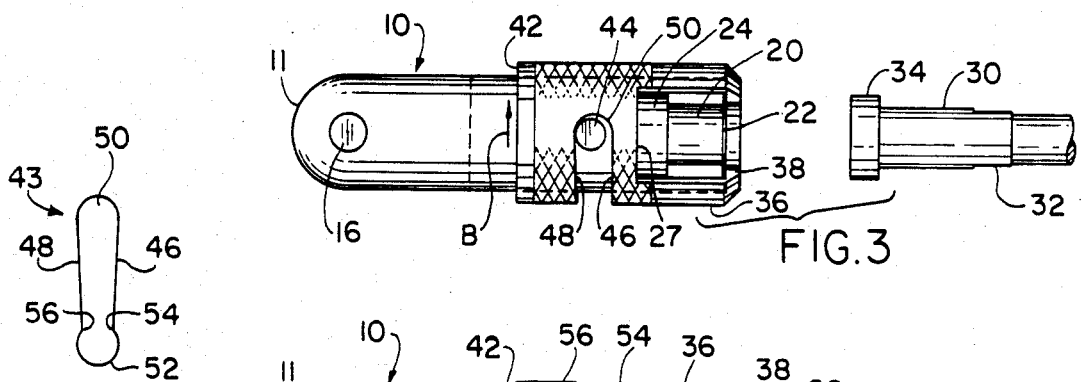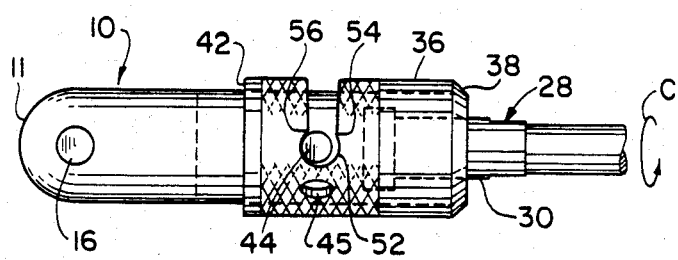

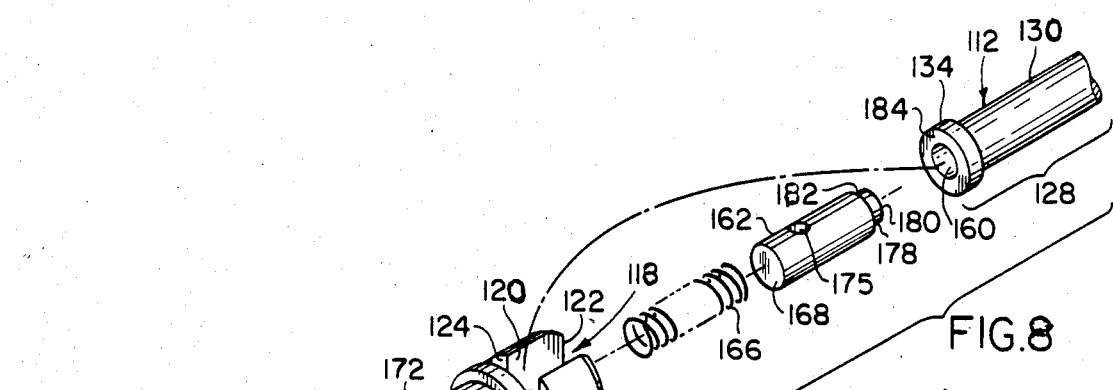
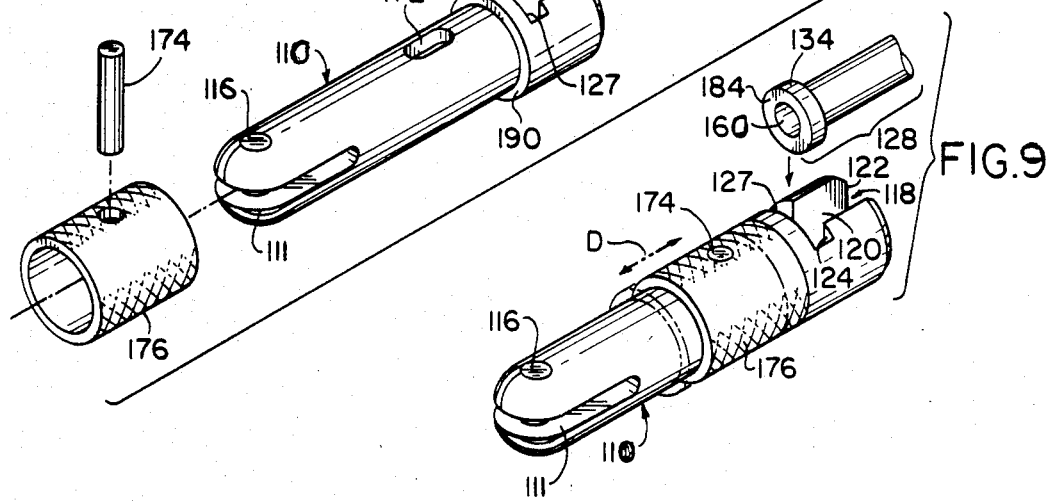
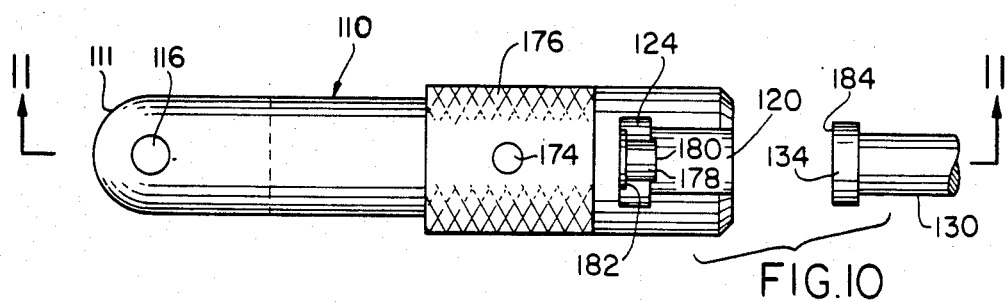
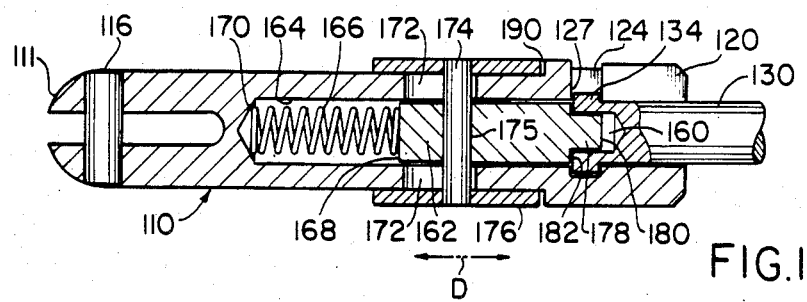

QUICK RELEASE CONNECTORS

BACKGROUND OF THE INVENTION

The present invention relates to a quick connect/disconnect two part coupling for joining the ends of tensioning line members such as ropes, stays or the like.

Couplings which are capable of being quickly connected and similarly disconnected are required for many functions, not the least of which includes their use in establishing tensioning lines for masts, stays, or other wire like members on board ships, boats or the like. In such uses, the coupling is subject not only to tensioning forces, but to compression, twisting and shear forces. These forces act simultaneously and sometime in random unpredictable ways on the coupling, so that the coupling must be extremely strong and secure as well as being easily manipulatable for connection or disconnection over and over.

Amongst the objects of the present invention is that of providing a coupling which satisfies the foregoing requirement in a simple and economical manner as well as a coupling which is easy to use and manipulatable in both the connection and disconnection mode.

These objects as well as other objects will be apparent from the following disclosure of the present invention.

SUMMARY OF THE INVENTION

According to the present invention, a two part coupling is provided comprising a first cylindrical member having an axially directed, and radially open female receptacle, a second cylindrical member having an axially extending male terminus conforming in shape to and being receivable in the receptacle through radial insertion therein, the first cylindrical member being provided with means manually operable to prevent radial dislodgement of the male member from the receptacle.

In particular, the two part coupling comprises a female element having a generally T-shaped receiving seat at one end and means for connecting the member to a line, rope, stay or the like at the other end and a male element having a generally T-shaped plug adapted to be received in the seat. The plug of the male element has a radialy enlarged head relative to a longitudinal extending body while the T-shaped seat has an enlarged transverse slot to receive the enlarged head, and a longitudinal opening to receive the longitudinally extending body of the male element. The female element is provided with means, movable to hold the male element within the seat and prevent its disengagement from the female element.

Preferably the female element is formed, so that at the end opposite of the T-shape seat, it is a clevis which may be easily attached to a line, stay, wire or the like. On the other hand, the male element may also be in form of clevis but preferably has a terminus opposite the plug that connects by other standard means to the end of the stay, wire or the like.

In one embodiment of the invention, the means for holding the plug of the male element in the T-shaped seat comprises a sleeve mounted about the female element so as to rotatably slide over and enclose the T-shaped seat. The sleeve is rotatable about the surface of the female element and is provided with an axial window opening which is coextensive with the T-shaped seat so that when rotated into one extreme position it will expose the seat, while when rotated to the opposing extreme position will cover the seat. To guide the sleeve between the two extreme positions the sleeve is slotted to provide a circumferentially disposed keyway into which a key pin, secured to the body of the female member, extends. The keyway slot is shaped to not only guide, but to act as a detent mechanism to hold the sleeve in the closed position. To effect this, detent action, the walls of the slot, forming the keyway are drawn inwardly in a taper to each other so that the keyway is enlarged to a greater extent at one end and narrows to provide an extremely tight force fit over which the pin must snap, into the extreme opposite end. Thus, the walls of the keyway slot form a cam detent which increases the pressure on the key pin and with a lateral squeezing action, locks the key pin into the extreme end position.

In a second embodiment, the head of the plug of the male element is provided with a central bore extending inwardly from its frontal face, along the central axis. The female element is simultaneously formed with an axially extending chamber along its central axis into which a spring loaded plunger is mounted. The plunger is held and guided in the chamber by a radial pin extending through an axial keyway slot formed in the body of male member. The pin is held in a sleeve which is itself reciprocably slidable along the surface of the male member. Thus, on axial movement of the sleeve, the plunger is manually movable. The plunger is normally biased in outward position so that it extends into the T-shaped seat and must be withdrawn axially by inward manipulation of the sleeve to allow the T-shaped head of the male element to enter the seat. Once the entry is made and the sleeve is subsequently released, the spring pushes the plunger forward so that the plunger itself moves into the bore in the head of the male element thereby capturing the male element in the T-shaped seat of the female member.

Full details of the present invention are set forth in the following description and are illustrated in the accompanying drawings.

BRIEF DESCRIPTION OF THE DRAWINGS

In the drawings:

FIG. 1 an exploded isometric view showing the coupling of the present invention;

FIG. 2 is an isometric assembly of the coupling shown in FIG. 1;

FIG. 3 is a plan view showing the coupling about to be engaged;

FIG. 4 is a view similar to that of FIG. 3 showing coupling locked together;

FIG. 5 is a sectional view of the female element taken in the direction of line 5—5 of FIG. 1;

FIG. 6 is a sectional view of the sleeve taken in the direction of line 6—6 of FIG. 1;

FIG. 7 is a planar development of the arcuate slot illustrating the detent mechanism;

FIG. 8 is a view similar to that of FIG. 1 showing another embodiment of the present invention employing a central plunger to hold the male member;

FIG. 9 is a view similar to that of FIG. 2 showing the coupling of FIG. 7 preparatory to connection;

FIG. 10 is a plan view similar to that of FIG. 3 showing the male element to be inserted in the T-shaped seat;

FIG. 11 is a cross-section taken along lines 11—11 of FIG. 10 to show the construction of the plunger type locking device.

DESCRIPTION OF THE INVENTION

In the embodiment of FIG. 1, the coupling comprises a cylindrical female element 10, and a male element 12, each of which is adapted for connection in more or less conventional manner to the end of a rope, wire, line or stay. In the illustrated embodiment, the female element 10 is provided at one end 11 with a clevis 14 having a transverse shaft 16 secured therein and about which the end of the rope or wire (not shown) is twistedly secured. At the opposite end 13 of the female element 10 there is formed in axial cross-section, a generally T-shaped seat generally depicted by the numeral 18. The T-shaped seat 18, as seen more clearly in FIGS. 3 and 5 comprises a longitudinal slot 20 concentric with the central axis, open at its outer end 22 and having at its inner end, a radially widened transverse circumferential slot 24. The slots 20 and 24 form an arcuate sector-shaped opening or entrance 26 lengthwise in the side of the element 10 extending axially from end 13 to the base 27 to expose the T-shaped seat 18 to radial entry of the male element 12 in the direction of arrow A of FIG. 2.

The male element 12, is formed generally as a plug 28 comprising an elongated cylindrical body 30 having at the rear end 32 means for attachment to a rope, wire, line or stay which is of any conventional form but which is, in the case illustrated, provided with a threaded and landed surface, and at its forward end with an enlarged disk like head 34. Thus, the plug 28 takes on a T-shaped form, which T-shape generally corresponds to that of the seat 18 in the female element 10. The dimensions of the T-shaped seat 18 as well as that of T-shaped plug 28 are selected so as to permit easy relative sliding movement of the plug 28, in the radial direction A into the T-shaped seat 18 so that the cylindrical body 30 of the plug 28 rests firmly but easily movable within the bore 20 of the seat 18 while the head 34 of the plug 28 similarly rests within the circumferential slot 24 of the seat 18.

To thereafter secure the plug 28 of the male element 12 within the T-shaped seat 18, the female element 10 is provided with an knurled outer sleeve 36 which may be slid over the female element 10 from the axially open outer end 13. The sleeve 36 is provided with a radially inwardly directed shoulder 38 which defines an open slot 39 that is sufficiently large to loosely received the body 30 therein. The inner wall of shoulder 38 abuts against the end 13 of the female element 10 thereby defining the extent of its axial inward movement. The sleeve 36 is provided with an arcuate sector-shaped entrance opening or window 40 which conforms in length and in arcuate dimension substantially equal to the arcuate entranceway sector opening 26 of the T-shaped seat 18.

Substantially midway between the base 27 of the seat 18 and the axially innermost edge 42 of the sleeve 36, the sleeve is provided with an keyway in the form of an arcuate through slot 43. The keyway slot 43 has an overall circumferential length (FIG. 7) slightly longer than that of the circumferential extent of either the open arcuate sector 26 of T-shaped seat 18 or that of the arcuate window 40 of the sleeve 36. A connecting key in the form of pin 44 is force fit into a diameter hole 37 in the body 13 of the female element 10 to extend radially outward into the path of movement of the keyway slot 43. The sleeve 36 is formed with a hole 45 permitting entry and removal of the connecting key pin 44 for the purposes of assembly and disassembly of the female element 10.

As seen in FIG. 7, the slot 43 has opposed relatively spaced edge walls 46 and 48 which are slightly tapered inwardly toward each other from one end 50 to the other end 52. The taper is such that at a point along the convergence of the end walls 46 and 48 toward each other the key pin 44 becomes slightly squeezed and frictionally binds between them so that relative freedom of movement becomes restricted. Just prior to the end 52 of the slot 43 both walls 46 and 48 converge to points 54 and 56 thus forming a cam detent which restricts relative the movement of the sleeve to a degree where considerable manual force is required to pass the points 54 and 56 arcuately beyond the pin 44. Once the sleeve rotates the points 54 and 56 past the pin 44, the pin releasably locks the sleeve in its fixed position end 52.

This form of keyway thus provides an "over-the center" snap-action which places the sleeve 36 in one of two extreme positions, i.e., open or closed, relative to the T-shaped seat 18. The exact shape of the slot 43 is not critical and a slot having curved edges, or bowed edges or one camming edge and one straight edge an be employed. However, care must be taken to provide sufficient decrease in the width in the slot 43 so that increased pressure squeezing on the pin 44 is effected so that firm locking retention action in its final position i.e. closed position is accomplished.

The coupling thus described, is extremely simple to form from cylindrical stock material. The female element 10 is made by conventional methods and does not require any complex manufacturing steps to form the open T-shaped seat 18 or to form the keyway slot 43 or to insert the key pin 44 therein, nor, does the surrounding sleeve 36 require complex machining for its fit about the body of the male member 12. In assembly, the keyway pin 44 is inserted through hole 45 in sleeve 36 within the receiving bore or hole 37 in the body of the female element 10 after the sleeve is put on and thereby held in the female element 10. The male member 12 can be formed generally from cylindrical stock material and the T-shaped head machined or otherwise formed thereon in any suitable manner.

In operation, the coupling is easily manipulated to radially insert the plug 28 of male element 12 into the T-shaped seat 18 of the female element 10. This may be done either by holding the male element 12 or by holding the female element 10 or both. Once the male element 12 is placed in the T-shaped seat 18, the conformingly T-shaped plug 28 will resist axial removal therefrom even with the sleeve 36 remaining in the open position. Therefore, the sleeve 36 may be easily rotated in the direction of arrow B (FIG. 3) to turn the window 40 away from the seat 18 so that the adjacent solid closed wall of the sleeve 36 covers the open seat 18, as seen in FIG. 4.

This ensures secure covering enclosure of the plug 28 in the seat 18. A simple relative twisting action of the sleeve 36 and the female element 10 causes the sleeve 36 to assume its locked retention position wherein pin 44 passes into the end 52 of the slot 43 so that it will not become accidentally displaced therefrom. Once the sleeve 36 is in its locked position, the coupling is capable of undergoing tension, compression, twisting, and shear forces without separation or dislodgement. On the other hand, a deliberate relative rotative reverse twisting action in the direction of arrow C (FIG. 4) of the sleeve and female element 10 will cause the slot 43 and pin 44 to move relative to each other to release them from their locked retention engagement. Full relative rotation will align the window 40 with the seat 18 to uncover the same and the plug 28 and permit removal of the plug 28 from the seat and uncouple the male element 12 from the female element 10.

In the embodiment shown in FIGS. 8-11, a male element 112 and a female element 110 are shown which are substantially identical in shape and form, to those shown in FIGS. 1-4. For convenience of description and understanding like elements will be identified with like tens numerals used in the first embodiment, but numbered in the 100 series. In this second embodiment the means by which they are interlocked is different. In this second embodiment, the male element 112 is provided with a bore 160 extending for a length axially into its head 134, while the female element 110 is provided with an internally arranged spring loaded plunger 162 (FIG. 11), the end of which is adapted to enter into the axial bore 160 so as to positivfely hold the male element 112 firmly in place within the T-shaped seat 118.

The construction of the plunger 162 is more clearly seen in FIG. 11. The female element 110 is formed with an elongated chamber 164 extending axially from the base 127 of T-shaped seat 118 inwardly toward its opposite clevis end 111. A compression spring 166 is mounted in the chamber 164 to bear against the inner end 168 of the plunger 162 and the bottom 170 of the chamber 164. A lengthwise slot 172 forming a keyway extends diametrically through the female element 110. A keypin 174 extends through the keyway slot 172 and is force fit internally in a hole 175 in the plunger 162 and radially outward to engage externally with a surrounding sleeve 176.

The sleeve 176 is a simple cylinder slidable over the surface of the female element 110. Movement of the sleeve 176 axially in the direction of Arrow D (FIG. 11) causes the plunger 162 to move reciprocally under bias of the compression spring 166 between a forward position and to be displaced manually rearward against such bias. The sleeve 176 is knurled enabling its easy grasped maniuplation and movement of the plunger 162 against the bias of the spring 166, as shown by the broken lines of FIG. 9.

The keyway slot 172 has a length such that the forward end 178 of the plunger 162 will normally extend outwardly into obstruction with the T-shaped seat 118. It is reduced in size so as to form a narrowed teat 180 along its central axis which is adapted to enter into the small bore 160 formed in the head 134 of the male member 112. Behind the teat 180, the forward end of the plunger forms a shoulder 182 which is adapted to engage against the frontal face 184 of the head 134 of the male member. In this way, the plunger 162 is normally biased to engage into the bore 160 as well as against the face 184 of the plug 128 of the male element 110 upon manual release of the sleeve 176.

Although in this latter embodiment the T-shaped seat 118 and the plug 128 of the male element 112 are not covered by the sleeve 176, firm and secure holding of the male and female coupling members together is accomplished by the insertion of the plunger 162 within the bore 160 of the head 134 of the male element 112. The action of the shoulder 182 against the frontal face 184 of head 134 of the male member 112, assures firm seating.

In the embodiment of FIGS. 8-11 the surface of the female element 110 is reduced in diameter behind the T-shaped seat 118 so as to permit the sleeve to be mounted from the clevis end 111 over the female element. The reduction results in a circumferential shoulder 190 against which the forward movement of the sleeve 176, under action of compression spring 166, is limited. This construction is not at all critical since the function of limiting the movement of the sleeve 176 is in effect taken over by the forward and rear ends of the axial keyway slot 172 through which the key pin 174 holding the plunger 62 passes.

In general, the ease of which this latter embodiment can be constructed is similar to that of the former embodiment in that the female element need only be modified by forming the central bore and the axial slot for the keyway. Similar to the earlier embodiment the operation of this latter embodiment and its use is also of a simple nature requiring only the initial manipulation of the knurled sleeve to withdraw the plunger 162 from the T-shaped seat 118 to permit the insertion of the male plug 128 into the T-shaped seat. Once this is accomplished the sleeve 176 may be released and the plunger 162 will automatically engage under bias of the spring 166 with the plug 28 and hold it in the T-shaped seat 118.

From the foregoing, it will be seen that the improved coupling permits quick attachment or detachment of ropes, lines, stays and the like. Since the device will be made of metal or plastic, it is suitable for use aboard boats, ships and the like.

Since various modifications, changes and adaptations have been suggested herein and others will be apparent to those skilled in the art. It is intended therefore that the present disclosure be taken as illustrative only and not limiting of the scope.

What is claimed:

1. A two-part coupling comprising elongated male and female parts interengagable end to end, each having at one end means for attachment to a rope, line, guy, or stay, said female part having at its other end a receptacle open on both the circumferential surface and the longitudinal frontal end surface, and said male part having its other end a plug conforming in shape to said receptacle and adapted when said male and female parts are held with their axes parallel to each other to enter laterally into said receptacle and to extend longitudinally outward from the frontal end surface in relatively axially fixed position, a sleeve slidably mounted about said other end of said female part, said sleeve having a circumferential opening conforming to the circumferential opening of said receptacle and being freely rotatable between a first position in which said openings in said sleeve and receptacle are aligned to permit insertion of said plug in said receptacle and a second position where said openings in said sleeve and receptacle are out of alignment said sleeve and female member being provided with cooperating means for preventing relative axial movement and for limiting the relative rotation of said sleeve and said female member, between said first position, and said second position, said cooperating means being operative to fix said sleeve in said second position against free rotation relative to said female part to thereby retain said plug in said receptacle.

2. The two-part coupling according to claim 1, wherein said receptacle comprises a T-shaped seat, said T-shaped seat having an axial bore open at the frontal end of said female part and an enlarged transverse slot at the inner end of said bore, said plug being conformingly T-shaped having a longitudinally extending body and an enlarged head extending transversely to said longitudinal extending body.

3. The two-part coupling according to claim 2 wherein said cooperating means for limiting relative rotation of said sleeve and female member comprises a slot forming a keyway extending about a portion of the circumference of said sleeve and a pin extending through said keyway slot and secured to said female element, said keyway slot being shaped to form a detent restricting the relative rotatable movement of said sleeve and female member between the first position wherein the seat is enclosed and the second position wherein the seat is exposed, said keyway slot having at least a wall applying pressure on said pin during a selected movement of said pin through said keyway slot to squeeze said pin against the walls of the slot and restrict its movement thereby fixing said sleeve against free rotation.

4. A two-part coupling comprising elongated male and female parts interengagable end to end each having at one end means for attachment to a rope, line guy, or stay, said female part having at its other end a receptacle open on both the circumferential surface and the longitudinal frontal end surface, and said male part having its other end a plug conforming in shape to said receptacle and adapted when said male and female parts are held with their axes parallel to each other to enter laterally into said receptacle and to extend longitudinally outward of the frontal end surface in relatively axially fixed position, and retention means mounted on said female part to be movable between a first position engaging said plug and acting to retain said plug within said receptacle and a second position disengaged from said plug to permit said plug to be freed from said receptacle, said retention means comprising a central bore extending inwardly through the frontal end of said male member, a spring biased plunger located coaxially in said female member, said plunger being normally biased outwardly into said receptacle to engage within the bore of said male member when said plug is inserted in said receptacle, and a sleeve slidably mounted on the exterior of said female member, an axial slot formed in said female member, and a pin connecting said sleeve and said plunger extending through said axial slot whereby said resiliently biased plunger can be moved between said first and second positions.

5. The two-part coupling according to claim 4, wherein said receptacle comprises a T-shaped receiving seat, said T-shaped seat having an axial bore open at the frontal end of said female part and an enlarged transverse slot at the inner end of said bore, said plug being conformingingly T-shaped having a longitudinally extending body and an enlarged head extending transversely to said longitudinal extending body.

6. The coupling according to claim 4 wherein said female element is formed with a central axial chamber in which said plunger is located, and includes a compression spring between the bottom of said chamber and the inner end of said plunger.

7. The coupling according to claim 4 including means for limiting the axial movement of said plunger, a circumferential collar formed on the female member adjacent the seat therein, said plunger and said female member being limited in relative movement by the inner end of said chamber and the abutment of said sleeve against said collar.

* * * * *